US010991360B2

(12) United States Patent
Bangalore et al.

(10) Patent No.: US 10,991,360 B2
(45) Date of Patent: *Apr. 27, 2021

(54) SYSTEM AND METHOD FOR GENERATING CUSTOMIZED TEXT-TO-SPEECH VOICES (71) Applicant: Cerence Operating Company, Burlington, MA (US)

(72) Inventors: Srinivas Bangalore, Morristown, NJ (US); Junlan Feng, North Plainfield, NJ (US); Mazin Gilbert, Warren, NJ (US); Juergen Schroeter, New Providence, NJ (US); Ann K. Syrdal, San Jose, CA (US); David Schulz, Wauwatosa, WI (US)

(73) Assignee: Cerence Operating Company, Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/664,694

(22) Filed: Jul. 31, 2017

(65) Prior Publication Data
US 2017/0330554 A1 Nov. 16, 2017

Related U.S. Application Data (63) Continuation of application No. 14/965,251, filed on Dec. 10, 2015, now Pat. No. 9,721,558, which is a (Continued)

(51) Int. Cl.
G10L 13/033 (2013.01)
G10L 13/06 (2013.01)
(Continued)

(52) U.S. Cl.
CPC ............ *G10L 13/033* (2013.01); *G10L 13/02* (2013.01); *G10L 13/06* (2013.01); *G10L 15/197* (2013.01); *G10L 13/00* (2013.01); *G10L 13/08* (2013.01)

(58) Field of Classification Search
CPC ......... G10L 13/08; G10L 13/06; G10L 13/02; G10L 13/00
See application file for complete search history.

(56) References Cited

U.S. PATENT DOCUMENTS 5,396,577 A 3/1995 Oikawa et al.
5,500,919 A * 3/1996 Luther .................... G06F 3/167
704/260

(Continued)

Primary Examiner — Samuel G Neway
(74) Attorney, Agent, or Firm — Occhiuti & Rohlicek LLP (57) ABSTRACT A system and method are disclosed for generating customized text-to-speech voices for a particular application. The method comprises generating a custom text-to-speech voice by selecting a voice for generating a custom text-to-speech voice associated with a domain, collecting text data associated with the domain from a pre-existing text data source and using the collected text data, generating an in-domain inventory of synthesis speech units by selecting speech units appropriate to the domain via a search of a pre-existing inventory of synthesis speech units, or by recording the minimal inventory for a selected level of synthesis quality. The text-to-speech custom voice for the domain is generated utilizing the in-domain inventory of synthesis speech units. Active learning techniques may also be employed to identify problem phrases wherein only a few minutes of recorded data is necessary to deliver a high quality TTS custom voice.

21 Claims, 4 Drawing Sheets

Related U.S. Application Data continuation of application No. 14/196,578, filed on Mar. 4, 2014, now Pat. No. 9,240,177, which is a continuation of application No. 10/845,364, filed on May 13, 2004, now Pat. No. 8,666,746.

(51) Int. Cl.
| | |
|---|---|
| *G10L 13/02* | (2013.01) |
| *G10L 15/197* | (2013.01) |
| *G10L 13/00* | (2006.01) |
| *G10L 13/08* | (2013.01) |

(56) References Cited

U.S. PATENT DOCUMENTS

| | | | | |
|---|---|---|---|---|
| 6,035,272 | A * | 3/2000 | Nishimura | G10L 13/07 704/258 |
| 6,182,045 | B1 * | 1/2001 | Kredo | H04M 3/493 379/67.1 |
| 6,505,158 | B1 * | 1/2003 | Conkie | G10L 13/07 704/260 |
| 6,601,030 | B2 * | 7/2003 | Syrdal | G10L 13/08 704/258 |
| 6,961,704 | B1 * | 11/2005 | Phillips | G10L 13/10 704/267 |
| 6,976,082 | B1 * | 12/2005 | Ostermann | H04L 29/06027 704/260 |
| 7,096,183 | B2 * | 8/2006 | Junqua | G10L 13/08 704/258 |
| 7,203,648 | B1 * | 4/2007 | Ostermann | G09B 21/009 704/260 |
| 7,219,060 | B2 * | 5/2007 | Coorman | G10L 13/06 704/258 |
| 7,328,157 | B1 * | 2/2008 | Chu | G10L 13/08 704/258 |
| 7,496,498 | B2 * | 2/2009 | Chu | G10L 13/08 704/2 |
| 8,666,746 | B2 * | 3/2014 | Bangalore | G10L 13/06 704/258 |
| 9,240,177 | B2 * | 1/2016 | Bangalore | G10L 13/06 |
| 2002/0072900 | A1 * | 6/2002 | Keough | G10L 13/033 704/220 |
| 2002/0178007 | A1 * | 11/2002 | Slotznick | G09B 5/06 704/270.1 |
| 2002/0193994 | A1 * | 12/2002 | Kibre | G10L 13/047 704/260 |
| 2003/0028380 | A1 * | 2/2003 | Freeland | G10L 13/00 704/260 |
| 2003/0130848 | A1 * | 7/2003 | Sheikhzadeh-Nadjar | G10L 13/10 704/260 |
| 2003/0216921 | A1 * | 11/2003 | Bao | G10L 13/08 704/260 |
| 2003/0222874 | A1 * | 12/2003 | Kong | H04M 1/72547 345/473 |
| 2004/0006471 | A1 | 1/2004 | Chiu | |
| 2004/0111271 | A1 * | 6/2004 | Tischer | G10L 13/033 704/277 |
| 2004/0254792 | A1 * | 12/2004 | Busayapongchai | H04M 3/4938 704/260 |
| 2005/0182630 | A1 * | 8/2005 | Miro | G10L 13/08 704/269 |
| 2005/0256716 | A1 * | 11/2005 | Bangalore | G10L 13/06 704/260 |
| 2008/0114756 | A1 * | 5/2008 | Konig | G06F 17/30867 |
| 2014/0188480 | A1 * | 7/2014 | Bangalore | G10L 13/06 704/260 |

\* cited by examiner

SYSTEM AND METHOD FOR GENERATING CUSTOMIZED TEXT-TO-SPEECH VOICES

PRIORITY INFORMATION

The present application is a continuation of U.S. patent application Ser. No. 14/965,251, filed Dec. 10, 2015, which is a continuation of U.S. patent application Ser. No. 14/196,578, filed Mar. 4, 2014, now U.S. Pat. No. 9,240,177, issued Jan. 19, 2016, which is a continuation of U.S. patent application Ser. No. 10/845,364, filed May 13, 2004, now U.S. Pat. No. 8,666,746, issued Mar. 4, 2014, the contents of which are incorporated herein by reference in their entirety.

BACKGROUND OF THE INVENTION

1. Field of the Invention

The present invention relates to spoken dialog systems and more specifically to system and method of building application-dependent text-to-speech custom voices.

2. Introduction

Figure 1:
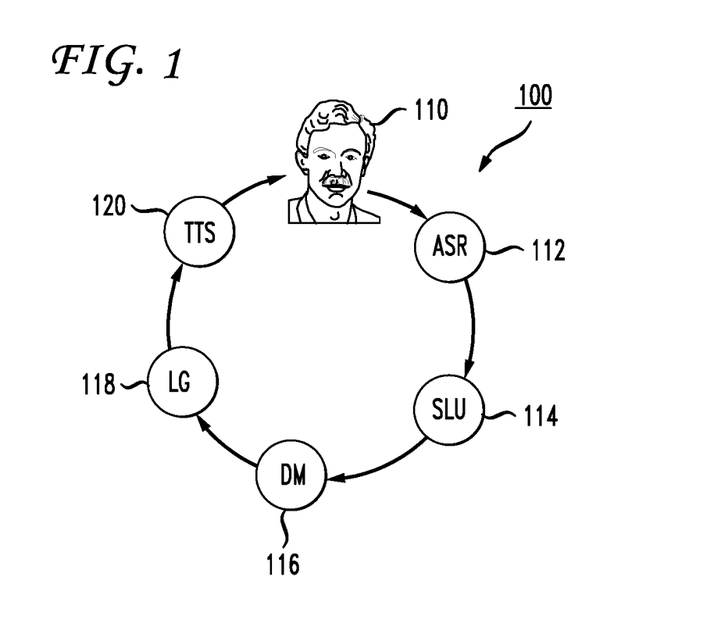
FIG. 1 illustrates a prior art spoken dialog system.

State-of-the-art spoken dialog systems include several components that enable the system to understand speech spoken by a user, generate a meaningful response, and then audibly speak the response. These basic components of such a system 100 are shown in FIG. 1. They typically include an automatic speech recognition (ASR) module 112 that receives speech from a user 110, a spoken language understanding (SLU) module 114 that receives text from the ASR module 112 and identifies a meaning or intent in the speech, a dialog management (DM) module 116 that receives the user intent and determines the substance of a response to the user, a language generation (LG) module 118 that generates the text of the response to the user and transmits the text to the text-to-speech (TTS) module 120 that generates the spoken response that the user 110 hears. The present invention relates to the TTS module and to the process of creating voices used by the TTS module to speak to the user.

The method for generating a TTS voice usually involves a costly and time-consuming process. For example, if a person desires to have their voice be used for a TTS voice in a spoken dialog system, several steps are typically necessary to build the custom voice. First, a developer selects text material for reading by the person. The text may relate to a specific domain of the spoken dialog system. An example of such a system may be a travel reservation system. The person would then be given text that relates to the context or domain of travel reservations, i.e., "what is your destination city?" The process of creating the custom voice then involves recording a speech corpus of the person to obtain data from which to generate the custom voice. This typically involves recording 10-20 hours of the person speaking or reading the selected text, and processing the speech to obtain an inventory of speech units that can be concatenated together to create a TTS voice. This is a very computationally intensive process and a time consuming process. For example, the time to build such a custom voice may take a month or more. In addition, the human expertise and professional interaction necessary to build such a custom voice is high. Significant human effort is required to create the custom voice.

The cost for such a process is prohibitive as well. The high cost to a potential buyer of a custom voice to collect the speech, label the speech and build the custom voice using the above-described approach prevents many companies from deploying a spoken dialog service. To accommodate for this cost, some companies use recorded prompts in a spoken dialog system. This approach, however, dramatically limits the flexibility and adaptability of the spoken dialog service to new questions and new interactions with the users. The cost to record enough prompts to handle every scenario also becomes time consuming and cost prohibitive.

What is needed in the art is a more efficient and less expensive approach to generating a custom, in-domain TTS voice.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

The present invention provides a method for creating high-quality customized application voices automatically with zero or little human interaction. The method requires no application speech data to be collected. One aspect of the invention relates to a method of generating a custom text-to-speech voice. The method comprises selecting a voice for generating a custom text-to-speech voice associated with an application domain, and collecting text data associated with the domain from a pre-existing text data source. Using the collected text data, the method further comprises generating an in-domain inventory of synthesis speech units by selecting speech units appropriate to the domain via a search of a pre-existing much bigger inventory of synthesis speech units and generating a text-to-speech custom voice for the domain utilizing the generated in-domain inventory of synthesis speech units.

To further enhance the quality of the TTS voice, active learning techniques may be employed to identify perceptually problematic sentences, phrases, words or speech units. From these identified problems, the developer can record speech associated with the problem areas and label the data to integrate that data into the in-domain inventory of speech units. In this manner, the quality of the synthesized voice is enhanced with only a few additional minutes of recorded data. Other embodiments of the invention are more fully described below.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 2:
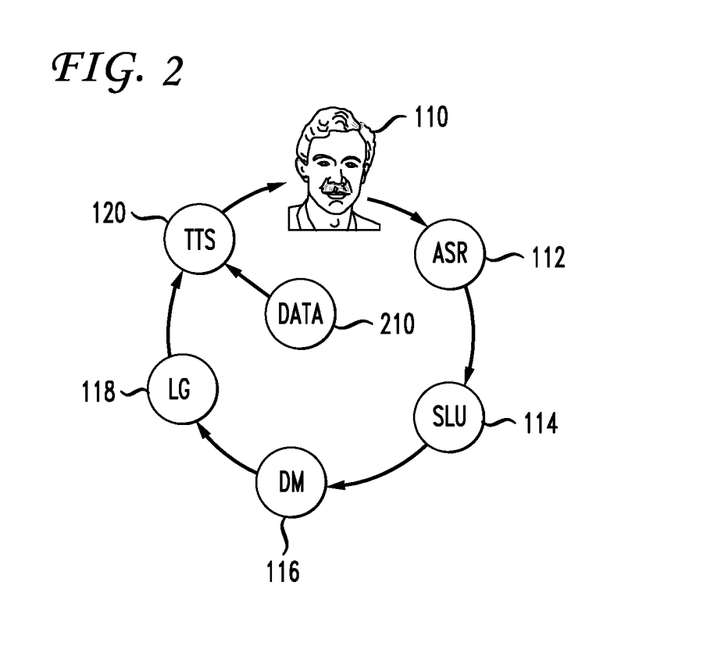
FIG. 2 illustrates a spoken dialog system wherein the TTS module utilizes databases to generate the custom voice.

FIG. 2 illustrates an aspect of the present invention. In general, the present invention enables the use of data 210 in the process of building a custom TTS voice. The data may come in numerous forms as will be explained herein. The present invention provides an efficient and less-costly approach to building application-dependent custom TTS voices. This approach also provides a higher quality voice than standard general-purpose TTS voices.

The present invention utilizes data 210 to automate the process of creating a synthetic TTS custom voice. While the preferred embodiment fully automates this process, there are alternate approaches where a minor portion of the process requires human intervention as will be seen from the description below.

Figure 3:
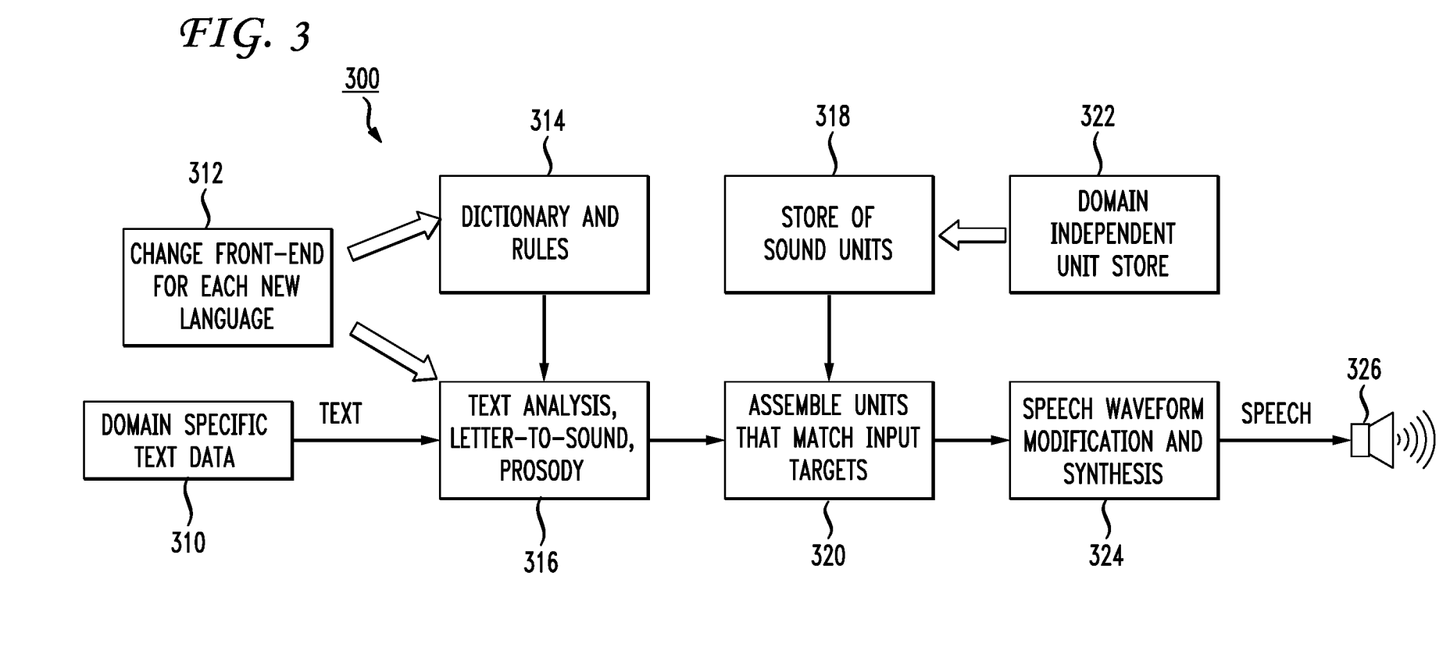
FIG. 3 illustrates a system according to an aspect of the invention.

A preliminary step in an aspect of the present invention is inventory preparation. To automate the voice generation process, first an inventory of speech units needs to be prepared. FIG. 3 illustrates the unit-selection TTS system according to an aspect of the present invention. A speaker is chosen for the custom voice and an automatic text selection process selects a minimal recording set of text which may or may not be for a specific domain such as travel reservations. It is assumed that a large preexisting speech corpus is available from which to generate the inventory for the custom voice. This large corpus of speech and associated sound units may be partitioned into vertical industrial sectors. Other pre-existing partitions may be utilized to help organize the data for use in automatically generating a custom TTS voice. The invention comprises preferably mining the existing speech corpus for specific speech units according to the selected text or identified domain. An alternate approach includes making a recording of the user speaking the minimal recording set. The minimal recording set would typically include highly relevant data for the particular domain. From either the mined speech corpus and/or the recorded minimal set, an inventory of speech units is created for the custom voice. The domain specific data is used as a caching mechanism through large task-independent corpora. Creating a task-specific custom voice can then be performed in a matter of minutes.

There are several ways a custom voice can be generated in this situation. One exemplary approach is to represent the models and data as finite state automata and apply statistical adaptation algorithms to bias the domain specific data. The resulting model not only promises to provide better quality output speech but also speed-ups the processing time. Given that these operations are essentially finite state compositions, they can be conducted within minutes. As task-specific speech data becomes available (through active learning or other methods), the same paradigm can be followed either in a supervised or in an unsupervised manner.

FIG. 3 shows an exemplary system 300 according to an aspect of the invention. Domain specific text data 310 (210) is identified and available for analysis. The Front-End 312 of the system is changed for each new language or person. The task of the Front-End 312 is to convert input text into linguistic tokens (symbolic representations) that are tagged with additional information such as prosody, pronunciation, and speech acts and emotions. A portion of this information is highly speaker-specific and, consequently, has to be adapted to the speaker, speaking-style, and language used. A dictionary and specific rules 314 are established to combine with the domain specific text in an analysis of the text, letter-to-sound issues, and prosody 316. This process enables the system to identify units of sound that will be valuable for the specific domain in which the TTS voice will operate. A store of unit sounds 318 is available to provide a database of unit sounds from which the assembled units that match input targets 320 are selected. From this process, the inventory of in-domain speech units is generated by the TTS module that generates the speech waveform modification and synthesis 324 to create the audible voice 326. As is known in the art, the choice of unit can include short units such as phonemes, diphones, and triphones as well as longer units such as syllables, words, phrases, and sentences.

Figure 4:
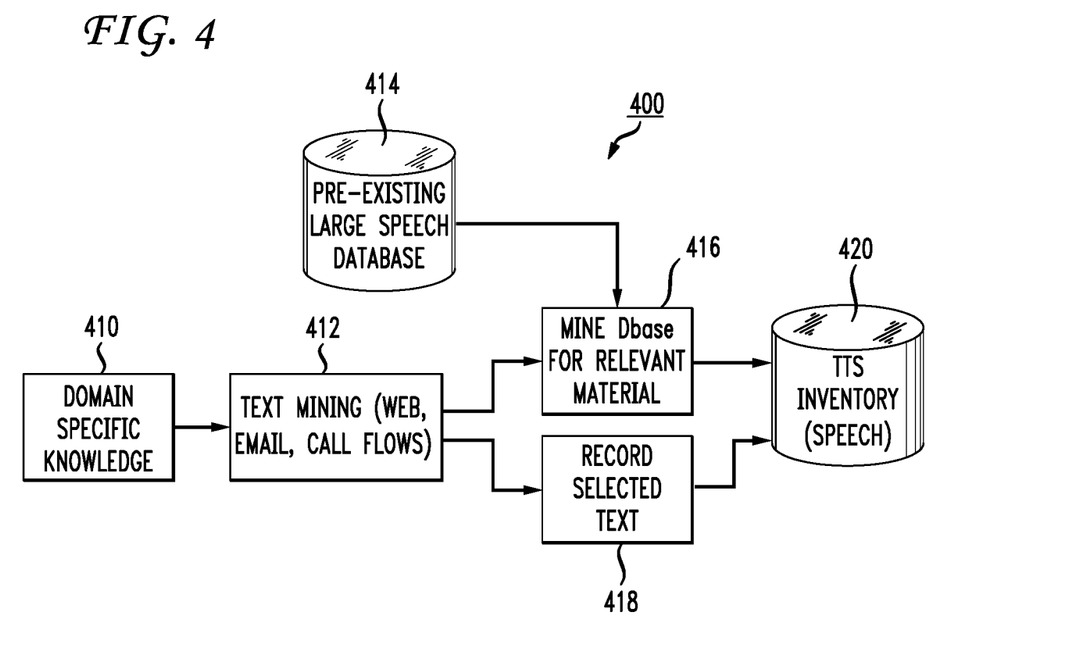
FIG. 4 illustrates several of the steps associated with text selection.

FIG. 4 illustrates the steps 400 of text selection related to feature 310 in FIG. 3. Domain specific knowledge 410 is identified for use in mining text from various data sources, such as a website, emails, text archives, call flow records or other media 412. Other sources of text data might be available, such as instruction manuals, books, pamphlets, or other databases. In the travel reservation domain, the source of text data for mining may include these and other sources of text data related to the particular domain. The text data from these sources is obtained and utilized to enable a more intelligent search through a bank of a speech databases for suitable synthesis units. Also shown is the pre-existing large speech database 414 from which relevant material is mined utilizing the mined text from web, emails, etc. 416. If the automated system cannot successfully mine sufficient amounts of relevant material from the pre-existing large speech database 414 (which is clearly needed when starting off with a new speaker/voice talent that has not been recorded before), an alternate approach is to have the user record the selected text 418 to provide the speech units necessary to create the TTS speech inventory 420 used by the TTS module to speak the custom voice. An advantage of the new approach over the conventional approach is that although some recording is going on, the recording is much less than is normally required to create the custom voice.

To further improve quality, active learning can be applied for unit selection so as to automatically identify poor quality data and to identify specific areas where speech recordings should occur in preparing the TTS voice. Active learning can enable a new system to be integrated into an existing system easily and inexpensively. Thus, the present invention can enhance the synthesis quality with only the minimum set of recorded data using the principles of active learning. The details and the various algorithms utilized in active learning are known to those of skill in the art and thus further information is not provided herein otherwise to note that this technology may be utilized as a component to automatically generating a TTS voice.

The approach of the present invention provides many advantages. For example, the quality of the TTS voice can be close to that of natural speech and can match the quality of recorded prompts if special-domain voices are used. There are cost savings associated with an automated or nearly automated process over the conventional systems. Another advantage is that updated information, changes in data, or changes in the subject matter of the domain can automatically be integrated into the system and a new TTS voice automatically deployed covering the new or changed subject matter. This is essential for up-to-date information rendering where information related to the domain is dynamic. This is also useful for personalization of the TTS voice.

Figure 5:
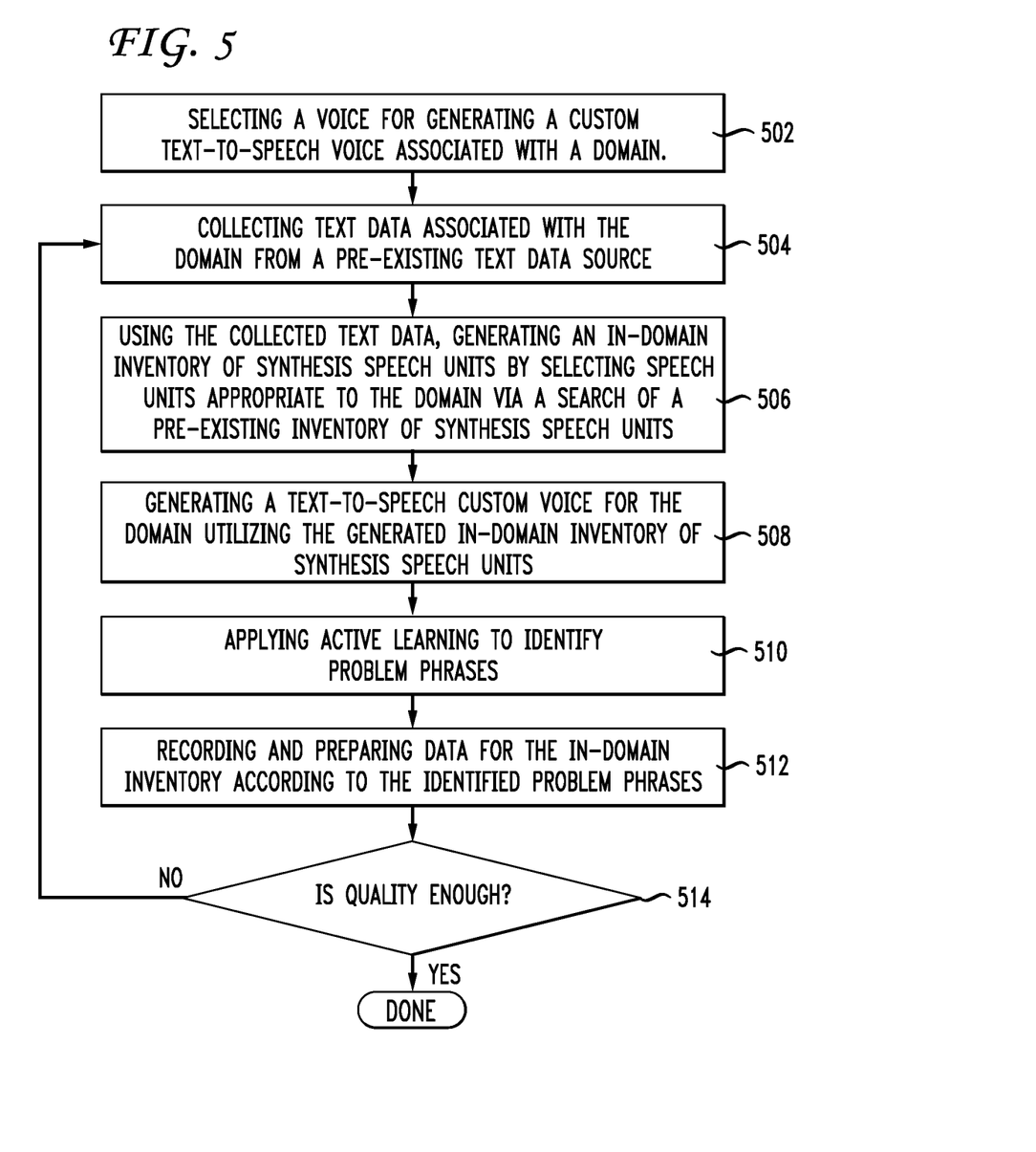
FIG. 5 illustrates a method according to an aspect of the present invention.

FIG. 5 illustrates a method according to an aspect of the present invention. The method comprises selecting a voice for generating a custom text-to-speech voice associated with a domain (502). An example of this step may be selecting a well-known celebrity voice or selecting your own voice for a TTS voice. The selected voice can be used in a spoken dialog system that exists in any context, such as a vehicle, appliance, or interactive website. If a famous person is selected, then it can be assumed that a large superset of speech covering much more subject matter than the domain requires is available. If no such large speech database is available (e.g., in the case of a new voice talent), then an alternate approach is to use the identified minimum text data for a particular application to record an in-domain voice database that is aimed at delivering extra-high quality text-to-speech for the targeted application. The method comprises collecting text data associated with the domain from a pre-existing text data source (504). The pre-existing data source may be such sources as a website, emails, transcriptions of voice conversations or other data sources. One aspect of the invention in this regard may involve additional steps of classifying data sources such as websites into industry sectors and selecting the classified data sources that are most relevant. For example, if the new application that requires a TTS voice is in the airlines reservation industry, reservation websites such as travelocity.com may be identified as a high value data source for industry-related text. A categorization module may be employed to search and determine website relevance.

Another module can then automatically extract relevant detailed text data and phrases that are salient to the application being developed. A variety of approaches may be used to identify the salient phrases including n-gram selection, maximal mutual information and other means. These phrases (speech units, words, phrases, sentences or paragraphs) are extracted, pre-processed and added to the inventory as part of the search strategy. Another approach is to add salient phrases manually to the inventory database. Using the collected text data, an in-domain inventory of synthesis speech units is generated by selecting speech units appropriate to the domain via a search of a pre-existing inventory of synthesis speech units (506). The text-to-speech custom voice is generated for the domain utilizing the in-domain inventory of synthesis speech units (508). As mentioned above, active learning may be applied to identify problem phrases (510) and based on the identified problem phrases, one can record and prepare data for the in-domain inventory according to the identified problem phrases (512). The method further comprises determining whether the quality of the synthesis is sufficiently high (514). If not, then the process returns to step 504 for further collection of data and to refine and improve the quality. In this regard, an alternate approach is to determine a minimal inventory for a selected level of synthesis quality for collection of data in step 504 and/or recording a minimal inventory in step 512. This reduces the workload at various stages in the process according to a selected level of quality. Then, if the quality of the synthesized voice is not sufficiently high in step 514, then more data collection occurs and/or more recording occurs in an iterative fashion until the requisite quality level is met. It may also be determined after step 514 that the only further preparation needed is the recording of more inventory, in which case the process would proceed from step 514 directly to step 512 for more recording followed by another quality check. This leads to a method where the process of creating a voice can be iterated until a sufficiently high quality synthesis has been achieved and where the synthesis generation process more closely matches the chosen synthesis quality.

Another example of the principles of the invention in operation would be for web interaction. Suppose a website has a "talking head" or 3D animated head that guides a person through the website. The service provider or talking head provider may enable the user to select various characters or features for the animated head. One of the options may be a voice option. If the user selects to use his or her own voice for interaction with the website, then the training process according to the present invention could utilize the existing text on that website for building the new customer voice for the user. Such a website could also have a text database of existing salient phrases such that database searches outside the scope of the website are unnecessary. The user may provide his own voice via a microphone connected to his computer or via a telephone connection. Text can be presented via the website for the user to read to collect voice segments for the inventory of speech units. The user may even approve a phone company recording over a period of time of his or her phone conversations to obtain hours of recordings of his or her voice. Other parties to the conversation would have any recording of their voices deleted. In this regard, the TTS voice may not necessarily be incorporated into a spoken dialog system where the user becomes engaged in a conversation with the animation. Any kind of appliance where a voice or a talking head animation would provide added value could utilize the principles of this invention. Thus, other embodiments of the invention relate to the various websites, handheld computing devices, kiosks, or any appliance employing a TTS voice customized according to the invention disclosed herein.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. For example, a car or vehicle may communicate with the driver via a personalized custom voice. In this regard, the invention may be a vehicle having a custom personalized voice. There are many products and services that may incorporate a customized voice generated according to the present invention. Accordingly, the appended claims and their legal equivalents should only define the invention, rather than any specific examples given.

We claim:

1. A method comprising:
maintaining a pre-existing inventory of synthesis speech units;
collecting text data from a pre-existing text data source, to yield collected text data, wherein the collected text data is associated with a website;
converting the collected text data into linguistic tokens associated with the website, the linguistic tokens tagged with additional information selected from the group consisting of prosody, pronunciation, and speech acts and emotions;
generating an in-domain inventory of synthesis speech units as a first subset of the synthesis speech units of the pre-existing inventory of synthesis speech units including selecting synthesis speech units specific to the website from the pre-existing inventory of synthesis speech units, wherein the selecting occurs using the linguistic tokens associated with the website, to yield the first subset of synthesis speech units, wherein the synthesis speech units comprise one or more of phonemes, diphones, triphones and syllables;
generating, after generating the in-domain inventory of synthesis speech units, via a processor, a custom text-to-speech voice for use with the web site utilizing the in-domain inventory of synthesis speech units; and
providing, by the processor, an animation-based interaction with the website using the custom text-to-speech voice, the providing including generating a spoken response including generating a second subset of the synthesis speech units of the in-domain inventory of synthesis speech units based at least in part on a text generated by a language generator.

2. The method of claim 1, further comprising:
caching the selected synthesis speech units to generate the in-domain inventory of synthesis speech units.

3. The method of claim 1, further comprising:
determining whether the custom text-to-speech voice conforms to a selected level of synthesis quality.

4. The method of claim 3, further comprising:
collecting additional text data associated with a domain if the custom text-to-speech voice does not conform to the selected level of synthesis quality.

5. The method of claim 4, further comprising:
iteratively collecting the additional text data until the custom text-to-speech voice conforms to the selected level of synthesis quality.

6. The method of claim 1, wherein the pre-existing text data source is one of a domain-related website, e-mail, and transcriptions of conversations.

7. The method of claim 1, wherein the pre-existing text data source is a sector-related website distinct from the website.

8. The method of claim 7, further comprising:
categorizing websites by sector to identify websites as pre-existing text data sources prior to collecting the text data.

9. The method of claim 1, wherein collecting the text data from the pre-existing text data source further comprises mining specific words and phrases from the pre-existing text data source.

10. The method of claim 9, wherein mining the specific words and phrases from the pre-existing text data source further comprises mining the specific words and phrases using an n-gram selection.

11. The method of claim 9, wherein mining the specific words and phrases from the pre-existing text data source further comprises mining the specific words and phrases using a maximal mutual information approach.

12. A system comprising:
a processor; and
a computer-readable storage medium having instructions stored which, when executed by the processor, cause the processor to perform operations comprising:
maintaining a pre-existing inventory of synthesis speech units;
collecting text data from a pre-existing text data source, to yield collected text data, wherein the collected text data is associated with a web site;
converting the collected text data into linguistic tokens associated with the website, the linguistic tokens tagged with additional information selected from the group consisting of prosody, pronunciation, and speech acts and emotions;
generating an in-domain inventory of synthesis speech units as a first subset of the synthesis speech units of the pre-existing inventory of synthesis speech units including selecting synthesis speech units specific to the website from a pre-existing inventory of synthesis speech units, wherein the selecting occurs using the linguistic tokens associated with the website, to yield the first subset of synthesis speech units, wherein the synthesis speech units comprise one or more of phonemes, diphones, triphones and syllables;
generating, after generating the in-domain inventory of synthesis speech units, a custom text-to-speech voice for use with the website utilizing the in-domain inventory of synthesis speech units; and providing an animation-based interaction with the website using the custom text-to-speech voice, the providing including generating a spoken response including generating a second subset of the synthesis speech units of the in-domain inventory of synthesis speech units based at least in part on a text generated by a language generator.

13. The system of claim 12, wherein the computer-readable storage medium stores additional instructions stored which, when executed by the processor, cause the processor to perform operations further comprising:

caching the selected synthesis speech units to generate the in-domain inventory of synthesis speech units.

14. The system of claim 12, wherein the computer-readable storage medium stores additional instructions stored which, when executed by the processor, cause the processor to perform operations further comprising:

determining whether the custom text-to-speech voice conforms to a selected level of synthesis quality.

15. The system of claim 14, wherein the computer-readable storage medium stores additional instructions stored which, when executed by the processor, cause the processor to perform operations further comprising:

collecting additional text data associated with a domain if the custom text-to-speech voice does not conform to the selected level of synthesis quality.

16. The system of claim 15, wherein the computer-readable storage medium stores additional instructions stored which, when executed by the processor, cause the processor to perform operations further comprising:

iteratively collecting the additional text data until the custom text-to-speech voice conforms to the selected level of synthesis quality.

17. The system of claim 12, wherein the pre-existing text data source is one of a domain-related website, e-mail, and transcriptions of conversations.

18. The system of claim 12, wherein the pre-existing text data source is a sector-related website distinct from the website.

19. The system of claim 18, wherein the computer-readable storage medium stores additional instructions stored which, when executed by the processor, cause the processor to perform operations further comprising:

categorizing websites by sector to identify websites as pre-existing text data sources prior to collecting the text data.

20. A computer-readable storage device having instructions stored which, when executed by a processor, cause the processor to perform operations comprising:

maintaining a pre-existing inventory of synthesis speech units;

collecting text data from a pre-existing text data source, to yield collected text data, wherein the collected text data is associated with a website;

converting the collected text data into linguistic tokens associated with the website, the linguistic tokens tagged with additional information selected from the group consisting of prosody, pronunciation, and speech acts and emotions;

generating an in-domain inventory of synthesis speech units as a first subset of the synthesis speech units of the pre-existing inventory of synthesis speech units including selecting synthesis speech units specific to the website from the pre-existing inventory of synthesis speech units, wherein the selecting occurs using the linguistic tokens, to yield associated with the website, to yield the first subset of synthesis speech units, wherein the synthesis speech units comprise one or more of phonemes, diphones, triphones and syllables;

generating, after generating the in-domain inventory of synthesis speech units, a custom text-to-speech voice for use with the web site utilizing the in-domain inventory of synthesis speech units; and providing an animation-based interaction with the website using the custom text-to-speech voice, the providing including generating a spoken response including generating a second subset of the synthesis speech units of the in-domain inventory of synthesis speech units based at least in part on a text generated by a language generator.

21. The method of claim 1 wherein generating the in-domain inventory of synthesis speech units further comprises receiving a recording of speech associated with at least some of the text data from the pre-existing text data source and processing the recording of speech to generate at least some synthesis speech units of the in-domain inventory of synthesis speech units.

* * * * *